US012595739B2

(12) United States Patent
Cherkaoui et al.

(10) Patent No.: US 12,595,739 B2
(45) Date of Patent: Apr. 7, 2026

(54) GAS TURBINE ENGINE BLADING COMPRISING A BLADE AND A PLATFORM WHICH HAS AN INTERNAL FLOW-INTAKE AND FLOW-EJECTION CANAL

(71) Applicant: Safran Aircraft Engines, Paris (FR)

(72) Inventors: Nour Cherkaoui, Moissy-Cramayel (FR); Ludovic Pintat, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/840,981

(22) PCT Filed: Feb. 21, 2023

(86) PCT No.: PCT/FR2023/050245
§ 371 (c)(1),
(2) Date: Aug. 23, 2024

(87) PCT Pub. No.: WO2023/161583
PCT Pub. Date: Aug. 31, 2023

(65) Prior Publication Data

US 2025/0188842 A1 Jun. 12, 2025

(30) Foreign Application Priority Data

Feb. 25, 2022 (FR) ....................................... 2201668

(51) Int. Cl.
*F01D 5/14* (2006.01)

(52) U.S. Cl.
CPC ............... *F01D 5/147* (2013.01); *F01D 5/14* (2013.01); *F01D 5/141* (2013.01); *F01D 5/143* (2013.01);

(Continued)

(58) Field of Classification Search
CPC . F01D 5/147; F01D 5/14; F01D 5/141; F01D 5/143; F01D 5/145; F05D 2220/323; F05D 2240/80
See application file for complete search history.

(56) References Cited

U.S. PATENT DOCUMENTS

| | | | | |
|---|---|---|---|---|
| 4,534,701 A * | 8/1985 | Wisser | F01D 11/08 | 415/171.1 |
| 8,398,364 B1 * | 3/2013 | Liang | F01D 5/145 | 415/58.7 |

(Continued)

FOREIGN PATENT DOCUMENTS

| | | | |
|---|---|---|---|
| CH | 204331 A * | 4/1939 | F04D 29/545 |
| DE | 102008029605 A1 * | 12/2009 | F01D 11/001 |

(Continued)

*Primary Examiner* — Brian Christopher Delrue
(74) *Attorney, Agent, or Firm* — BIRCH, STEWART, KOLASCH & BIRCH, LLP

(57) ABSTRACT

The present invention relates to blading (25, 26) for a turbomachine (10), comprising: —a blade (31) having an aerodynamic profile; —a platform (32, 33) comprising a flow-path surface (321) intended to delimit a primary flow path (21A) of the turbomachine (10), which path is intended, when the turbomachine (10) is in operation, to receive a flow that splits, upstream of the blade (31), into a suction-face flow (EE) and a pressure-face flow (EI); and —an internal canal (34) which has an intake opening (35) and an ejection opening (36), these each opening onto the flow-path surface (321) of the platform (32, 33), the ejection opening (36) opening downstream of the intake opening (35) and the intake opening (35) opening toward the pressure-face flow (EI).

10 Claims, 6 Drawing Sheets

(52) U.S. Cl.
CPC ........ *F01D 5/145* (2013.01); *F05D 2220/323* (2013.01); *F05D 2240/80* (2013.01)

(56) References Cited

U.S. PATENT DOCUMENTS

| | | | | |
|---|---|---|---|---|
| 9,739,157 | B2 * | 8/2017 | Uskert | F01D 5/282 |
| 10,030,523 | B2 * | 7/2018 | Quach | F01D 5/18 |
| 10,167,726 | B2 * | 1/2019 | Devore | F01D 25/12 |
| 10,215,051 | B2 * | 2/2019 | Thomen | F04D 29/542 |
| 10,221,694 | B2 * | 3/2019 | Snyder | F01D 9/02 |
| 11,560,802 | B2 * | 1/2023 | Otomo | F01D 25/12 |
| 12,018,582 | B2 * | 6/2024 | Coussirou | F01D 5/145 |
| 12,372,004 | B2 * | 7/2025 | Coussirou | F01D 11/122 |
| 2005/0238483 | A1 * | 10/2005 | Guemmer | F04D 29/682 415/169.1 |
| 2009/0263233 | A1 * | 10/2009 | Guemmer | F04D 29/684 415/52.1 |
| 2010/0254802 | A1 * | 10/2010 | Freeman | F01D 5/145 415/115 |
| 2011/0044798 | A1 * | 2/2011 | Digard Brou De Cuissart | F01D 11/001 415/115 |
| 2011/0052380 | A1 * | 3/2011 | Bariaud | F01D 9/042 415/182.1 |
| 2011/0127352 | A1 * | 6/2011 | Fachat | F01D 11/001 239/265.15 |
| 2016/0153286 | A1 * | 6/2016 | Suciu | F01D 11/18 415/191 |
| 2017/0002678 | A1 * | 1/2017 | Subramanian | F04D 29/542 |
| 2017/0030375 | A1 | 2/2017 | Shibata et al. | |
| 2018/0231026 | A1 * | 8/2018 | Namadevan | F01D 11/04 |
| 2019/0085713 | A1 * | 3/2019 | Delaporte | F01D 25/246 |
| 2021/0246802 | A1 * | 8/2021 | Pintat | F01D 5/145 |
| 2021/0254483 | A1 | 8/2021 | Pintat | |
| 2021/0381389 | A1 | 12/2021 | Buonvino et al. | |
| 2022/0268211 | A1 * | 8/2022 | Matsuo | F02C 7/18 |

FOREIGN PATENT DOCUMENTS

| | | | | | |
|---|---|---|---|---|---|
| EP | 2952682 | A1 | * | 12/2015 | F01D 5/187 |
| EP | 3084136 | B1 | * | 12/2020 | F04D 29/324 |
| EP | 3508701 | B1 | * | 3/2021 | F01D 9/065 |
| FR | 2999249 | A1 | * | 6/2014 | F04D 29/545 |
| FR | 3114839 | A1 | * | 4/2022 | F01D 11/001 |

* cited by examiner

GAS TURBINE ENGINE BLADING COMPRISING A BLADE AND A PLATFORM WHICH HAS AN INTERNAL FLOW-INTAKE AND FLOW-EJECTION CANAL

FIELD OF THE INVENTION

The invention relates to the field of aircraft gas turbine engines, and more particularly to the field of gas turbine engine blade assemblies comprising an airfoil, a platform and an inner channel for a turbine of a gas turbine engine.

STATE OF THE ART

An aircraft conventionally comprises at least a gas turbine engine to ensure the propulsion. The gas turbine engine can be a turbojet engine or a turboprop. The gas turbine engine comprises a fan, a compressor, a combustion chamber, a turbine, and a gas exhaust nozzle.

A turbojet engine can be a turbofan engine, in which the mass of air sucked by the fan is divided into a primary stream which passes through the compressor, the combustion chamber and the turbine, and a secondary stream which is concentric with the primary stream. For example, the gas turbine engine can comprise a low-pressure compressor, a high-pressure compressor, a high-pressure turbine and a low-pressure turbine. The high-pressure turbine drives in rotation the high-pressure compressor via a high-pressure shaft, and the low-pressure turbine drives in rotation the low-pressure compressor via a low-pressure shaft. The low-pressure turbine can also drive in rotation the fan either directly via the low-pressure shaft, or via a reducer disposed between the low-pressure turbine and the fan, the reducer being driven in rotation by the low-pressure shaft.

The gas turbine engine extends substantially about a longitudinal axis.

A conventional aircraft gas turbine engine turbine comprises one or more stages each consisting of a distributor and of a rotor wheel. The distributors and the rotor wheels are thus arranged alternately along the longitudinal axis of the gas turbine engine.

The distributor comprises vanes connected by their radially outer end to a casing and which are distributed circumferentially about the longitudinal axis of the turbine so as to form a stator ring. The rotor wheel comprises a disk and blades connected to the disk by their radially inner end while being circumferentially distributed around the disk. The distributor of a turbine stage is configured so that a flow of fluid entering this stage, typically comprising gases coming from the combustion chamber, is accelerated and deflected by the stator vanes towards the blades of this rotor wheel of this stage so as to drive them in rotation about the longitudinal axis. One example of design of such a turbine is known from document FR 3 034 129.

In general, a distributor blade of the turbine comprises an airfoil and two platforms which radially delimit therebetween a circumferential portion of an annular primary flow path in which the airfoil extends. The fluid passing through the turbine flows mainly in this primary flow path.

During the operation of a conventional turbine, the interaction of the fluid with the distributors and the rotor wheels produces vortices at the level of the platforms of the blades, forming flows called "secondary" flows.

These secondary flows have the effect of reducing the efficiency of the turbine and increasing the fuel consumption of the gas turbine engine.

DISCLOSURE OF THE INVENTION

One aim of the invention is to propose a gas turbine engine blade assembly which makes it possible to limit the formation of these secondary flows and to reduce the intensity of these secondary flows, which makes it possible to improve the aerodynamic efficiency of the blade assembly.

To this end, the object of the invention is, according to a first aspect, a gas turbine engine blade assembly intended to be mounted about a longitudinal axis, and comprising:

- an airfoil which extends radially with respect to the longitudinal axis and which has an aerodynamic profile delimited axially upstream by a leading edge and downstream by a trailing edge, the airfoil further comprising an intrados wall and an extrados wall opposite to the intrados wall, the intrados wall and the extrados wall each connecting the leading edge to the trailing edge;
- a platform comprising a path surface from which the airfoil extends, the platform being intended to delimit a primary flow path of a stream of the gas turbine engine in operation, the stream dividing, upstream of the leading edge of the airfoil during the operation of the gas turbine engine, on the one hand into an extrados flow flowing on the side of the extrados wall of the airfoil and on the other hand into an intrados flow flowing on the side of the intrados wall of the airfoil; and
- an inner channel which has a suction aperture and an ejection aperture which are each disposed on the side of the intrados wall of the airfoil and which each open out onto the path surface of the platform, the ejection aperture opening out downstream of the suction aperture and the suction aperture opening out towards the intrados flow.

Some preferred but non-limiting characteristics of the blade assembly according to the first aspect are as follows, taken individually or in combination:

- the suction aperture and/or the ejection aperture has a circular shape, an oblong shape, a slot shape, a flared shape, or comprises a plurality of orifices;
- the intrados flow flows globally between a point of separation located upstream of the leading edge of the airfoil and corresponding to a point at the level of which the intrados flow and the extrados flow divide, and a point of impact located downstream of the leading edge of the airfoil and corresponding to a point at the level of which the intrados flow comes into contact with an airfoil circumferentially adjacent to the airfoil;
- the suction aperture extends along a main direction and corresponds to one of the following four suction apertures:
- a first suction aperture which has an aperture that opens out onto the path surface and that extends along a main direction substantially perpendicular to the direction of the intrados flow, the first suction aperture opening out towards the leading edge or directly upstream of the leading edge of the airfoil;
- a second suction aperture which has an aperture that opens out onto the path surface and that extends along a main direction substantially perpendicular to the direction of the intrados flow, the second suction aperture opening out downstream of the leading edge of the airfoil, the second suction aperture opening out closer to the point of separation than to the point of impact;

a third suction aperture which has an aperture that opens out towards the point of impact; or a fourth suction aperture which has an aperture that opens out onto the path surface and that extends along a main direction substantially parallel to the direction of the intrados flow, the fourth suction aperture opening out between the leading edge and the trailing edge of the airfoil along a circumferential direction;

the ejection aperture extends along a main direction and corresponds to one of the following three ejection apertures:

a first ejection aperture located closer to the leading edge than to the trailing edge of the airfoil, which opens out towards the intrados wall of the airfoil;

a second ejection aperture located substantially between the leading edge and the trailing edge of the airfoil, which opens out towards the intrados wall of the airfoil, the second ejection aperture preferably having a main direction substantially parallel to the intrados wall of the airfoil; or a third ejection aperture located closer to the trailing edge than to the leading edge of the airfoil and which opens out towards the trailing edge of the airfoil;

the suction aperture corresponds to the first suction aperture and the ejection aperture corresponds to the third ejection aperture;

a section of the inner channel of the ejection aperture is smaller than a section of the inner channel of the suction aperture;

the platform is an inner platform, the path surface of the inner platform being adapted to delimit the primary flow path radially inwards;

the blade assembly extends radially about the longitudinal axis and further comprises another airfoil circumferentially adjacent to the airfoil, in which said circumferentially adjacent airfoil extends radially with respect to the longitudinal axis and has an aerodynamic profile delimited axially upstream by a leading edge and downstream by a trailing edge, the circumferentially adjacent airfoil further comprises an intrados wall and an extrados wall opposite to the intrados wall, the intrados wall and the extrados wall each connecting the leading edge to the trailing edge, in which the circumferentially adjacent airfoil is adapted to extend radially from the path surface of the platform in the primary flow path so that the extrados wall of the circumferentially adjacent airfoil is located facing the intrados wall of the airfoil, in which the intrados flow globally flows between a point of separation located upstream of the leading edge of the airfoil and corresponding to a point at the level of which the intrados flow and the extrados flow divide, and a point of impact located downstream of the leading edge of the airfoil and corresponding to a point at the level of which the intrados flow comes into contact with the extrados wall of the circumferentially adjacent airfoil;

the blade assembly is a gas turbine engine turbine, particularly low-pressure turbine, distributor;

the blade assembly is a gas turbine engine compressor distributor;

the blade assembly is a gas turbine engine turbine, particularly low-pressure turbine, rotor wheel;

the blade assembly is a gas turbine engine compressor rotor wheel.

According to a third aspect, the invention proposes a gas turbine engine turbine comprising at least a blade assembly, particularly a distributor or a rotor wheel, according to the second aspect.

The turbine can be a low-pressure turbine. As a variant, the turbine can be a high-pressure turbine.

According to a fourth aspect, the invention proposes a gas turbine engine compressor comprising at least a distributor or a rotor wheel according to the second aspect.

The compressor can be a low-pressure compressor. As a variant, the compressor can be a high-pressure compressor.

According to a fifth aspect, the invention proposes a gas turbine engine comprising at least a blade assembly according to the first aspect, particularly a gas turbine engine comprising a turbine according to the third aspect.

The gas turbine engine can be a two-spool gas turbine engine.

According to a sixth aspect, the invention proposes an aircraft comprising at least a blade assembly according to the first aspect.

DESCRIPTION OF THE FIGURES

Other characteristics, aims and advantages of the invention will emerge from the following description, which is purely illustrative and not limiting, and which should be read in relation to the appended drawings in which.

DETAILED DESCRIPTION OF THE INVENTION

Figure 1:
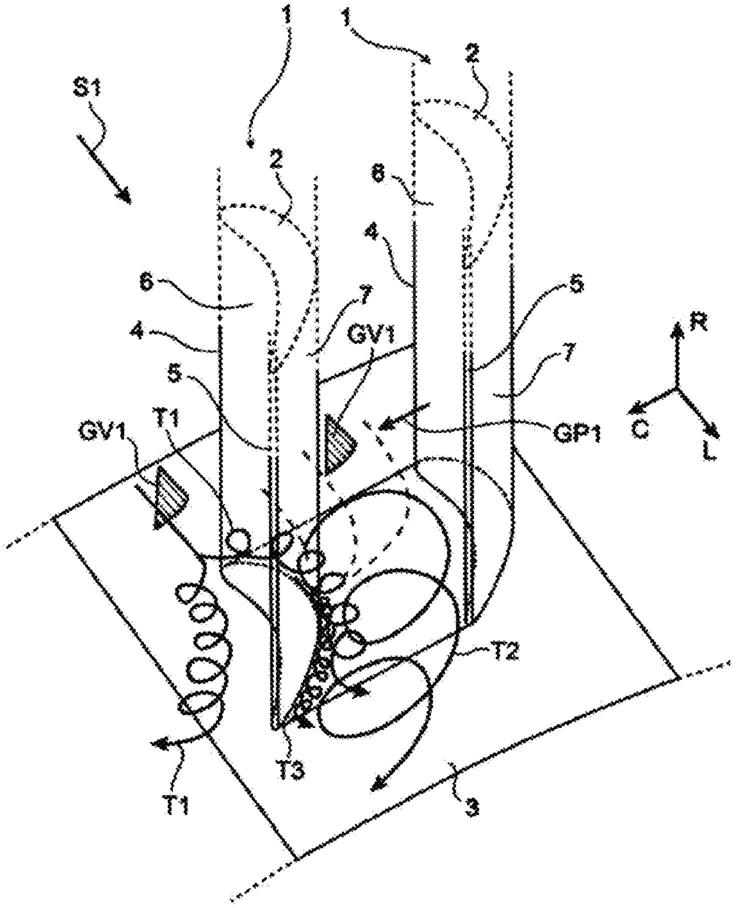
FIG. 1 is a partial schematic perspective view of a distributor of a conventional turbine for an aircraft gas turbine engine, illustrating secondary flows which occur during the operation of the gas turbine engine.

In the present application, the upstream and the downstream are defined in relation to a direction S1 of normal flow of the gas through the gas turbine engine 10 in operation, an air stream flowing into the gas turbine engine 10 from upstream to downstream. The longitudinal axis X corresponds to an axis of rotation of the gas turbine engine 10, particularly to an axis of rotation of a turbine 17, 18 of the gas turbine engine 10. A radial axis is an axis perpendicular to the longitudinal axis X and passing therethrough. A circumferential axis is an axis perpendicular to the longitudinal axis X and not passing therethrough. A longitudinal L, respectively radial R or circumferential C direction corresponds to the direction of the longitudinal axis X, respectively radial or circumferential axis. The longitudinal L, radial R and circumferential C directions are orthogonal to each other.

The terms inner and outer, respectively, are used with reference to a radial direction R such that the inner part or face of an element is closer to the longitudinal axis X than the outer part or face of the same element.

The gas turbine engine 10 can be a turbojet engine or a turboprop. The gas turbine engine 10 extends about the longitudinal axis X. The gas turbine engine 10 can comprise a fan 13, at least a compressor 14, 15, a combustion chamber 16, at least a turbine 17, 18, and a gas exhaust nozzle.

Figure 2:
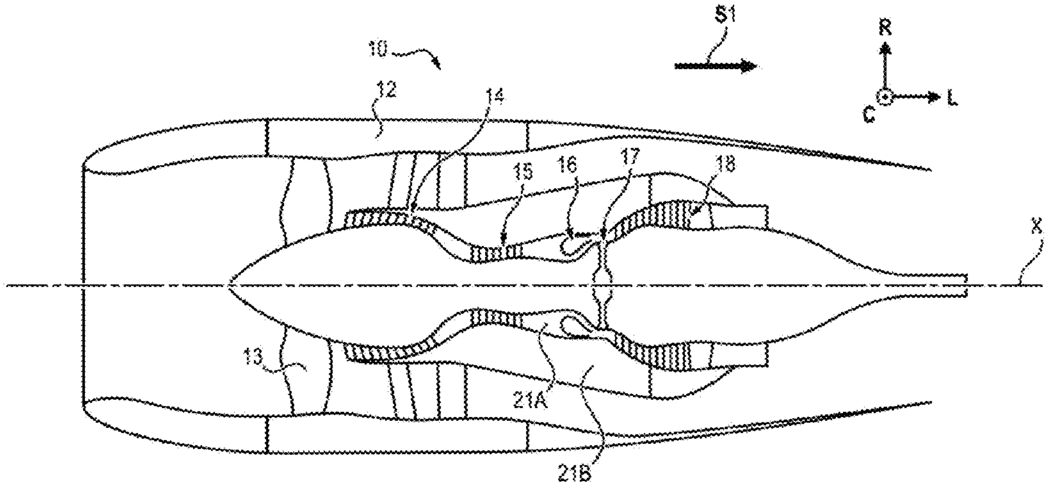
FIG. 2 is a schematic axial sectional view of a propulsion assembly for an aircraft.

In the non-limiting exemplary embodiment represented in FIG. 2, the gas turbine engine 10 is a two-spool turbofan engine, ducted by a nacelle 12. The gas turbine engine 10 comprises, from upstream to downstream, a fan 13, a low-pressure compressor 14, a high-pressure compressor 15, a combustion chamber 16, a high-pressure turbine 17 and a low-pressure turbine 18. The high-pressure turbine 17 drives in rotation the high-pressure compressor 15 via a high-pressure shaft, and the low-pressure turbine 18 drives in rotation the low-pressure compressor 14 via a low-pressure shaft. The low-pressure turbine 18 can also drive in rotation the fan 13 either directly via the low-pressure shaft, or via a reducer disposed between the low-pressure turbine 18 and the fan 13, the reducer being driven in rotation by the low-pressure shaft. The compressors 14 and 15, the combustion chamber 16 and the turbines 17 and 18 form a gas generator. During the operation of the gas turbine engine 10 illustrated in FIG. 2, an air flow enters into the gas turbine engine 10, through an air inlet upstream of the nacelle 12, passes through the fan 13 then divides into a central primary stream and a secondary stream. The primary stream flows in a primary flow stream 21A and passes through the compressors 14 and 15, the combustion chamber 16 and the turbines 17 and 18, and the secondary stream flows in a secondary flow path 21B which is concentric with the primary flow path 21A and is delimited radially outwards by the nacelle 12.

In general, a distributor 25 blade 30 of the turbine 17, 18 comprises an airfoil and two platforms which radially delimit therebetween a circumferential portion of the annular primary flow path in which the airfoil extends. A rotor wheel 26 blade 30 of the turbine 17, 18 comprises a single platform, which delimits the primary flow path thereinside. The fluid passing through the turbine 17, 18 mainly flows in this primary flow path.

During the operation of a conventional turbine 17, 18, the interaction of the fluid with the distributors 25 and the rotor wheels 26 produces vortices at the level of the platforms of the blades, forming flows called "secondary" flows.

Particularly, FIG. 1 illustrates part of a blade assembly 25, 26 of a conventional gas turbine engine, more particularly part of two blades 1 of a turbine distributor 25, these blades 1 being circumferentially adjacent relative to each other. FIG. 1 shows more particularly a radially inner part of an airfoil 2 and a platform 3 of each of the blades 1. The airfoil 2 of each blade 1 comprises a leading edge 4, a trailing edge 5, an intrados wall 6 and an extrados wall 7. The platform 3 is common to the two blades 1 and is an inner platform which delimits radially outwards a circumferential portion of a primary flow path in which a fluid flows in a direction S1 going from the leading edge 4 to the trailing edge 5 of the airfoil 2.

Given the typical viscosity of the fluid circulating in the primary flow path, its flow along the surface of the platform 3 presents a speed gradient GV1 such that, in the vicinity of this surface, the speed of a layer of fluid is all the lower as this layer is closer is to this surface. In other words, due to friction with the platform 3, the flow at the level of the platform 3 has a low speed, the moment of the fluid being low. The fluid flowing in the primary flow path is also subjected to a pressure gradient GP1 oriented in this example from the intrados wall 6 of the airfoil 2 of the blade 1 illustrated on the right in FIG. 1 to the extrados wall 7 of the airfoil 2 of the adjacent blade 1 illustrated on the left in FIG. 1. The pressure gradient GP1 is generally sufficient to deflect the layers of fluid flowing in the vicinity of the surface of the platforms 3, from the blade 1 shown on the right in FIG. 1 to the adjacent blade 1 illustrated on the left in FIG. 1.

This results in the appearance of different types of vortices. A first type of vortices T1, called "horseshoe", takes the form of two counter-rotating branches distributed on either side of the airfoil 2 of the blade 1. A second type of vortices T2, called "passage vortices", develops between two adjacent airfoils 2 of two adjacent blades 1. A third type of vortices T3, called "corner vortices", runs along the connection lines between the airfoil 2 and the platform 3 of the blade 1.

Such secondary flows T1, T2 and T3, which typically occur at the base and at the top of the airfoils 2, are not oriented in the direction S1 of main flow of the fluid passing through the primary flow path and consequently lead to a reduction in the efficiency and an increase in the kerosene consumption of the gas turbine engine comprising a conventional blade assembly 25, 26.

Figure 4:
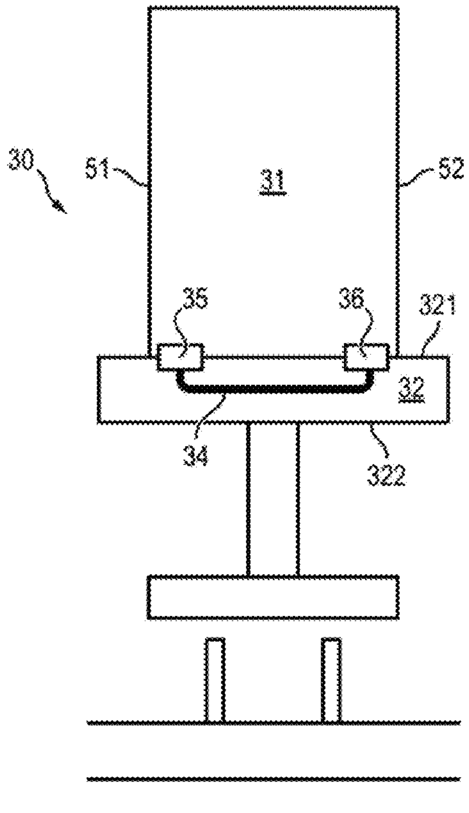
FIG. 4 is a partial schematic illustration of a blade assembly in accordance with one embodiment of the invention, comprising an airfoil, a platform and an inner channel.
Figure 5:
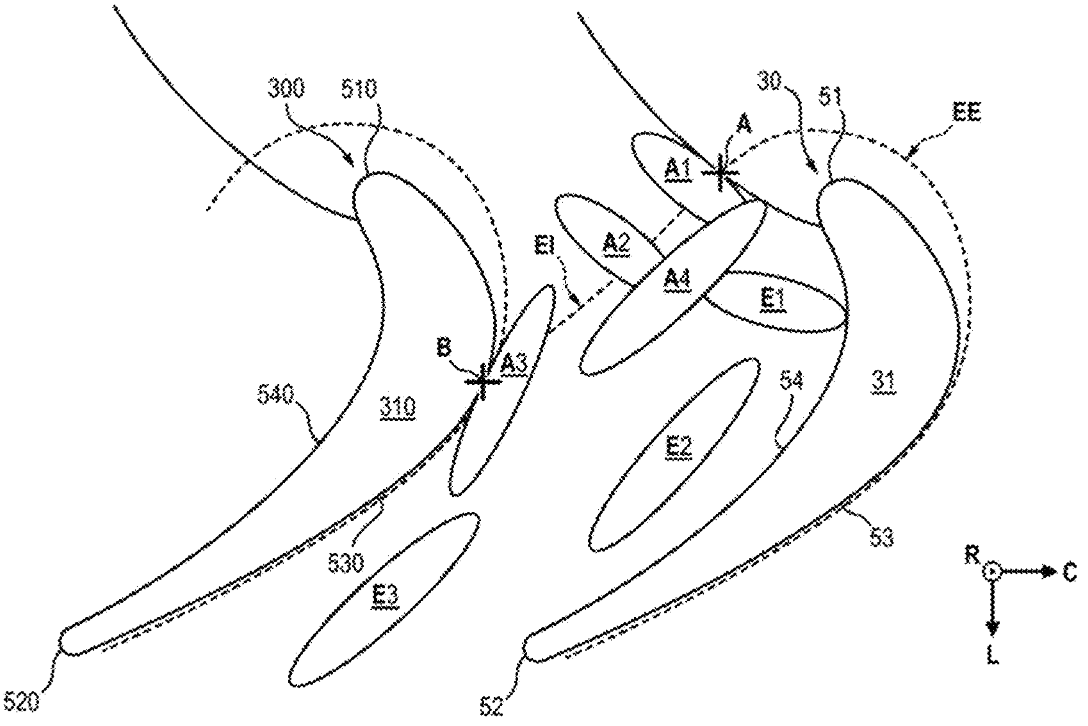
FIG. 5 is a diagram illustrating different configurations of suction apertures and ejection apertures of a blade assembly according to different embodiments of the invention.

FIG. 4 and FIG. 5 illustrate non-limiting examples of a blade assembly 25, 26 of a gas turbine engine 10. The gas turbine engine 10 blade assembly 25, 26 is intended to be mounted about the longitudinal axis X and comprises:

- an airfoil 31 which extends radially with respect to the longitudinal axis X and which has an aerodynamic profile delimited axially upstream by a leading edge 51 and downstream by a trailing edge 52, the airfoil 31 further comprising an intrados wall 54 and an extrados wall 53 opposite to the intrados wall 54, the intrados wall 54 and the extrados wall 53 each connecting the leading edge 51 to the trailing edge 52; and
- a platform 32, 33 comprising a path surface 321 from which the airfoil 31 extends, the platform 32, 33 being intended to delimit a flow path of a primary stream 21A of the gas turbine engine 10 in operation, the stream dividing, upstream of the leading edge 51 of the airfoil 31 during the operation of the gas turbine engine 10, on the one hand into an extrados flow EE flowing on the side of the extrados wall 53 of the airfoil 31 and on the other hand into an intrados flow EI flowing on the side of the intrados wall 54 of the airfoil 31; and
- an inner channel 34 which has a suction aperture 35 and an ejection aperture 36 which are each disposed on the side of the intrados wall 54 of the airfoil 31 and which each open out onto the path surface 321 of the platform 32, 33, the ejection aperture 36 opening out downstream of the suction aperture 35 and the suction aperture 35 opening out towards the intrados flow EI.

The blade 30 provided with such an inner channel 34 makes it possible to suck part of the fluid flowing along the path surface 321 of the platform 32, 33 and to prevent this part of the fluid from contributing to the formation of secondary flows. By opens out "onto" the path surface 321, it is understood that the suction aperture 35 and the ejection aperture 36 each form at least an aperture made in the path surface 321. By opens out "towards" the intrados flow EI, it is understood that the suction aperture 35 comprises an aperture opening out at least partially at the level of a point of the intrados flow EI.

Indeed, given the typical viscosity of the fluid circulating in the flow path of the primary stream 21A, also called primary flow path 21A, its flow along the path surface 321 of the platform 32, 33 presents a speed gradient such that, in the vicinity of this path surface 321, the speed of a layer of fluid is all the lower as this layer is close to the path surface 321. The fluid flowing in the primary flow path 21A is moreover subjected to a pressure gradient oriented from the intrados wall 54 of the airfoil 31 to an extrados wall 530 of a circumferentially adjacent airfoil 310 of the blade assembly 25, 26. The pressure gradient tends to deflect the layers of fluid flowing in the vicinity of the path surface 321 of the platform 32, 33, from the airfoil 31 towards the circumferentially adjacent airfoil 310.

However, the fluid circulating in the primary flow path 21A and arriving at the level of the suction aperture 35 of the blade assembly 25, 26 described above is sucked into the inner channel 34 given the static pressure differential between the region of the primary flow path 21A surrounding the suction aperture 35, called suction area, and the region of the primary flow path 21A surrounding the ejection aperture 36, called ejection area. In a turbine 17, 18 in operation, the static pressure is indeed significantly lower downstream of an airfoil 31 than upstream of the airfoil 31. Consequently, the static pressure is significantly lower at the level of the ejection area, which is located downstream of the suction area, than at the level of the suction area.

Thus, this geometry of inner channel 34 as described above makes it possible to take part of the primary stream in the primary flow path 21A and to eject it at the level of the ejection aperture 36 under the effect of the static pressure differential between the suction aperture 35 and the ejection aperture 36. The suction of the boundary layer thus takes place in the suction area before and/or during the development of the secondary vortices, which makes it possible to reduce the secondary flows. The sucked flow rate is accelerated in the inner channel 34, and reinjected into the ejection area downstream of the suction area, so as to re-energize the boundary layer into the ejection area. The blade assembly 25, 26 thus prevents the intrados flow EI from deflecting towards the extrados wall 530 of the circumferentially adjacent airfoil 310 due to the pressure gradient between the intrados wall 54 of the airfoil 31 and the extrados wall 530 of the circumferentially adjacent airfoil 310, at the level of which the pressure is greater than the pressure at the level of the intrados wall 54 of the airfoil 31. The suction of the boundary layer and the ejection to re-energize the boundary layer are thus improved, this which makes it possible to improve the aerodynamic efficiency of the blade assembly 25, 26.

The blade assembly 25, 26 thus makes it possible to limit the formation of secondary flows and to reduce the intensity of the secondary flows which are likely to occur. Thus, the blade assembly 25, 26 makes it possible to reduce the aerodynamic losses related to the development of the secondary flows. The blade assembly 25, 26 thus makes it possible to improve the efficiency and reduce the kerosene consumption of the gas turbine engine 10. Particularly, the blade assembly 25, 26 makes it possible to reduce the losses downstream of the airfoil 31, by reducing the angle and path Mach distortion generated by the secondary flows.

The inner channel 34 forms a passive suction system which does not require any additional suction device, for example mechanically or electrically controlled. Indeed, the suction and the reintroduction of gases into the primary flow path 21A works naturally thanks to the static pressure differential between the suction area and the ejection area downstream of the suction area. The passive suction system thus constitutes a significant advantage compared to a system called "active" system requiring external intervention, particularly is simple to manufacture and to implement, and robust.

In addition, the sucked part of the fluid is ejected into the primary flow path 21A, and therefore contributes to driving the gas turbine engine 10. In particular, when the blade assembly 25, 26 is a distributor 25 of a turbine 17, 18 of the gas turbine engine 10, the invention makes it possible to isolate in the distributor 25 the boundary layer, source of appearance of secondary phenomena, to then reintroduce it into the primary stream which was depleted. The reintroduction of air occurs substantially along the direction of propagation and before the primary stream reaches the consecutive rotor wheel 26 in the primary flow path 21A, and therefore participates fully in the rotation of the rotor wheel 26 of the same stage and located directly downstream of the distributor 25. In other words, the part of the fluid thus ejected into the primary flow path 21A constitutes part of the flow rate of the fluid driving the consecutive rotor wheel 26. The distributor 25 comprising the airfoil 31, the suction aperture 35 and the ejection aperture 36, is located upstream of said rotor wheel 26. Thus, the flow rate in the primary flow path 21A is unchanged, and the flow can work normally in order to provide mechanical energy to the rotor wheel 26. The gain in the efficiency of the turbine 17, 18 is therefore significant, the primary flow being used in its entirety while being less subject to parasite vortices that disperse energy.

The airfoil 31 extends in the primary flow path 21A of the gas turbine engine 10 delimited by the path surface 321 of the platform 32, 33. The intrados wall 54 and the extrados wall 53 of the airfoil 31 each connect the leading edge 51 and the trailing edge 52 of the airfoil 31, and are separated by a distance corresponding to a thickness of the airfoil 31. The leading edge 51 of the airfoil 31 forms an upstream end of the airfoil 31 in the primary flow path 21A. The leading edge 51 of the airfoil 31 is thus configured to extend facing the flow of gases in the gas turbine engine 10. The trailing edge 52 of the airfoil 31 corresponds to the posterior part of the aerodynamic profile, where the intrados flow EI and the extrados flow EE meet, and forms a downstream end of the airfoil 31 in the primary flow path 21A.

The suction aperture 35 opens out onto the path surface 321 at the level of the intrados flow EI. The ejection aperture 36 opens out onto the path surface 321 downstream of the intrados flow EI and downstream of the suction aperture 35.

The airfoil 31 can be an airfoil 31 of a blade 30 of the blade assembly 25, 26. The blade assembly 25, 26 then comprises a blade 30 which comprises the airfoil 31 with an aerodynamic profile capable of being placed in the air stream when the gas turbine engine 10 is in operation in order to generate lift, and a base configured to be fixed to a rotating or fixed hub of the blade assembly 25, 26 at the level of an inner end of the blade 30.

The blade 30 may be a composite blade comprising a composite material structure including a fibrous reinforcement obtained by three-dimensional weaving and a matrix into which the fibrous reinforcement is embedded. The fibrous reinforcement can be formed from a single-piece fibrous preform obtained by three-dimensional or multi-layer weaving with evolving thickness. The fibrous reinforcement can then comprise warp and weft strands which can in particular comprise carbon, glass, basalt, and/or aramid fibers. The matrix can be a polymer matrix, for example epoxy, bismaleimide or polyimide. The blade 30 can be formed by molding using a vacuum resin injection process of the RTM (Resin Transfer Molding) type or VARRTM (Vacuum Resin Transfer Molding) type.

The airfoil 31 can be formed of a plurality of sections of airfoils 31 stacked along an airfoil axis 31 from a radially inner end to a radially outer end of the airfoil 31.

The airfoil 31 further has a chord defined, in a plane normal to the airfoil axis 31, by a fictitious straight line segment connecting the leading edge 51 and the trailing edge 52 of the airfoil 31.

The platform 32, 33 can further comprise a second surface 322 opposite to the path surface 321. The inner channel 34 is formed in the platform 32, 33 between the path surface 321 and the second surface 322.

The platform 32, 33 can be an inner platform 32, the path surface 321 of the inner platform 32 being adapted to delimit radially inwards the primary flow path 21A. The second surface 322 of the inner platform 32 is then internal relative to the path surface 321. As a variant, the platform 32, 33 can be an outer platform 33, the path surface 321 of the outer platform 33 being adapted to delimit radially outwards the primary flow path 21A. The second surface 322 of the outer platform 32, 33 is then external relative to the path surface 321. The primary flow path 21A is substantially annular. For example, a compressor 14, 15 or turbine 17, 18 rotor wheel 26 generally comprises an inner platform 32, and a compressor 14, 15 or turbine 17, 18 distributor 25 generally comprises an inner platform 32 and an outer platform 33.

In the schematic and simplified representation of FIG. 4, the path surface 321 and the second surface 322 are planar and parallel to each other. Of course, each of these surfaces 321, 322 can have a non-planar geometry and be generally oriented along an oblique direction relative to the longitudinal L and radial R directions. Furthermore, the leading edge 51 and the trailing edge 52 are rectilinear and parallel to each other. Of course, each of these edges 51, 52 can have a non-rectilinear geometry and be generally oriented along an oblique direction relative to the radial direction R. Particularly, a platform 32, 33 can have hollows and bumps on the path surface 321.

A fictitious line located equidistant from the leading edge 51 and the trailing edge 52 of the airfoil 31 delimits an upstream part and a downstream part of the platform 32, 33. The stream flows in the primary flow path 21A in a flow direction S1 going from the leading edge 51 to the trailing edge 52 of the airfoil 31 and from the upstream part to the downstream part of the platform 32, 33.

The blade assembly 25, 26 can comprise several blades 30 and/or several platforms 32, 33 as described above. Particularly, the blade assembly 25, 26 can comprise the same number of blades 30 and platforms 32, 33, each blade 30 being mounted on a respective platform 32, 33, particularly in the case of blades 30 of a rotor wheel 26. As a variant, several blades 30 can be mounted on the same platform 32, 33, particularly in the case of blades 30 of a distributor 25. For example, the blades 30 can be mounted four by four on respective platforms 32, 33, four blades 30 being mounted on the same platform 32, 33.

The blade assembly 25, 26 extends radially about the longitudinal axis X and can further comprise an airfoil circumferentially adjacent 310 to the airfoil 31. Said circumferentially adjacent airfoil 310 extends radially with respect to the longitudinal axis X and has an aerodynamic profile delimited axially upstream by a leading edge 510 and downstream by a trailing edge 520. The circumferentially adjacent airfoil 310 further comprises an intrados wall 540 and an extrados wall 530 opposite to the intrados wall 540, the intrados wall 540 and the extrados wall 530 each connecting the leading edge 510 to the trailing edge 520. The circumferentially adjacent airfoil 310 can be adapted to extend radially from the path surface 321 of the platform 32, 33 in the primary flow path 21A so that the extrados wall 530 of the circumferentially adjacent airfoil 310 is located facing the intrados wall 54 of the airfoil 31.

The circumferentially adjacent airfoil 310 can be an airfoil of a circumferentially adjacent blade 300 of the blade assembly 25, 26. The blade assembly 25, 26 then comprises the blade 30 and the circumferentially adjacent blade 300 to the blade 30.

The circumferentially adjacent blade 300 can be substantially identical to the blade 30. The circumferentially adjacent blade 300 is neighboring the blade 30. The blade 30 and the circumferentially adjacent blade 300 can be circumferentially distributed side by side in the primary flow path 21A. The intrados flow EI flows between the intrados wall 54 of the airfoil 31 and the extrados wall 530 of the circumferentially adjacent airfoil 310.

When the circumferentially adjacent airfoil 310 of the circumferentially adjacent blade 300 is adapted to extend from the path surface 321 of the platform 32, 33, the platform 32, 33 is common to the blade 30 and to the circumferentially adjacent blade 300. The inner channel 34 is formed in the platform 32, 33 between the airfoil 31 and the circumferentially adjacent airfoil 310. The non-limiting example of FIG. 5 illustrates such a blade assembly 25, 26 comprising an airfoil 31 and a circumferentially adjacent airfoil 310 mounted on a common platform 32, 33. The airfoil 31 is represented on the right in FIG. 5, and the circumferentially adjacent airfoil 310 is represented on the left in FIG. 5.

As a variant, the blade assembly 25, 26 can further comprise an adjacent platform substantially identical to the platform 32, 33. The platform 32, 33 and the adjacent platform are fixed relative to each other and together delimit at least a portion of the primary flow path 21A. The circumferentially adjacent airfoil 310 is adapted to extend from a path surface of the adjacent platform into the primary flow path 21A so that the extrados wall 530 of the circumferentially adjacent airfoil 310 is located facing the intrados wall 54 of the airfoil 31. The inner channel 34 can be formed in the platform 32, 33 or in the circumferentially adjacent platform.

The position, dimensions and geometry of the suction aperture 35 and of the ejection aperture 36 are chosen according to the characteristics of the flow and of the secondary vortices formed at the level of the blade assembly 25, 26, and as a function of the desired level of re-energization of the boundary layer, and are determined so as to dimension the sucked air flow rate, as well as the speed and angle of the ejected air, with a view to minimizing the mixing losses. Particularly, the ejection aperture 36 can be configured to reorient the gas stream so as to re-energize the boundary layer at the level of the ejection aperture 36. The configuration of the suction aperture 35 and of the ejection aperture 36 may result from a compromise between the pressure differential between the suction aperture 35 and the ejection aperture 36 which must be increased to increase the sucked fluid flow rate, and the length of the inner channel 34 which must be reduced to reduce the aerodynamic losses in the inner channel 34.

The suction aperture 35 and/or the ejection aperture 36 may have a circular shape, an oblong shape, a slot shape, a flared shape, any other shape suitable for sucking and/or ejecting an air flow rate into the primary flow path 21A. As a variant, the suction aperture 35 and/or the ejection aperture 36 can comprise a plurality of orifices, for example a plurality of circular, oblong or slot-shaped orifices. For example, the suction aperture 35 and/or the ejection aperture 36 can have an ovoid, rectangular, triangular, parallelepiped, conical, prismatic section, or any other section that those skilled in the art could consider.

When the suction aperture 35 and/or the ejection aperture 36 comprises a plurality of orifices, for example circular orifices, the orifices can be disposed in a staggered manner on the path surface 321 of the platform 32, 33, so as to efficiently collect the air stream contiguous to the path surface 321. The inner channel 34 connects the circular orifices of the suction aperture 35 to the ejection aperture 36 and/or connects the suction aperture 35 to the circular orifices of the ejection aperture 36.

When the suction aperture 35 and/or the ejection aperture 36 comprises a plurality of orifices in the form of slots, the inner channel 34 is split into a plurality of passages each opening out onto a slot of the suction aperture 35 and/or of the ejection aperture 36.

The suction aperture 35 and/or the ejection aperture 36 can comprise an intrusive scoop, a non-intrusive scoop, or one or a plurality of fin(s).

The suction aperture 35 and/or the ejection aperture 36 can be obtained for example by drilling or additive manufacturing.

Figure 6A:
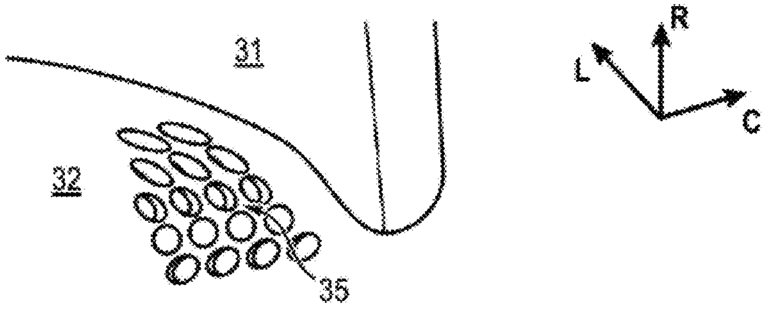
FIG. 6*a* is a partial schematic perspective view of a blade assembly comprising an inner channel comprising a suction aperture according to a first embodiment of the invention.
Figure 6B:
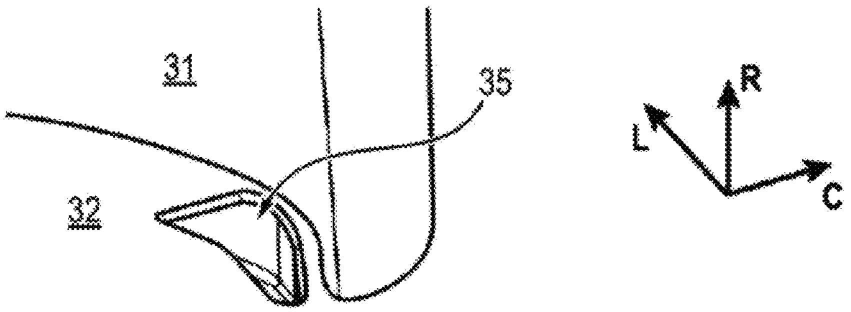
FIG. 6*b* is a partial schematic perspective view of a blade assembly comprising an inner channel comprising a suction aperture according to a second embodiment of the invention.
Figure 6C:
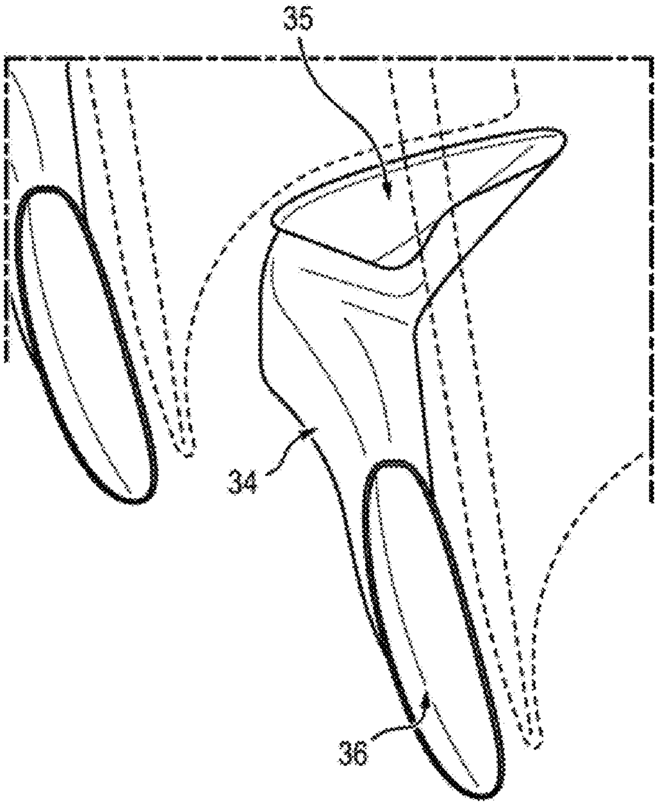
FIG. 6*c* is a partial schematic perspective view of an inner channel of a blade assembly according to one embodiment of the invention.

FIG. 6*a*, FIG. 6*b* and FIG. 6*c* illustrate different types of suction apertures 35 and/or ejection apertures 36 according to the invention. In the example of FIG. 6*a*, the inner channel 34 comprises a suction aperture 35 having seventeen circular orifices. In the example of FIG. 6*b*, the inner channel 34 comprises a suction aperture 35 in the form of a curved slot disposed so as to run along the intrados wall 54 of the airfoil 31. The ejection aperture 36 may be identical to the suction aperture 35 of FIG. 6*a* or FIG. 6*b*. In the example of FIG. 6*c*, the inner channel 34 comprises a suction aperture 35 in the form of a curved slot, and an ejection aperture 36 in the form of a slot.

The intrados flow EI can flow globally between a point of separation A located upstream of the leading edge 51 of the airfoil 31 and corresponding to a point at the level of which the intrados flow EI and the extrados flow EE divide, and a point of impact B located downstream of the leading edge 51 of the airfoil 31 and corresponding to a point at the level of which the intrados flow EI comes into contact with a circumferentially adjacent airfoil 310 to the airfoil 31. The vortices begin to form at the level of the point of separation A, and impact the circumferentially adjacent airfoil 310 at the point of impact B. The intrados flow EI can be compared to a flow line which extends between the point of separation A and point of impact B.

The point of separation A is the point at the level of which the stream which circulates in the primary flow path 21A and which arrives on the airfoil 31 separates into two, namely the intrados flow EI, or intrados vortex, which is adapted to flow towards the trailing edge 52 of the airfoil 31 on the side of the intrados wall 54 of the airfoil 31, and the extrados flow EE, or extrados vortex, which is adapted to flow towards the trailing edge 52 of the airfoil 31 on the side of the extrados wall 53 of the airfoil 31. The point of separation A can be located directly upstream of the leading edge 51, that is to say a distance along the longitudinal axis X between the point of separation A upstream of leading edge 51 and leading edge 51 of the airfoil 31 is less than 10% of the chord of the airfoil 31.

The point of impact B is the point at the level of which the intrados flow EI comes into contact with the extrados wall 530 of the circumferentially adjacent airfoil 310. A distance between the point of impact B and the leading edge 51 of the airfoil 31 along the longitudinal axis X can be less than or substantially equal to a distance between the point of impact B and the trailing edge 52 of the airfoil 31. For example, the point of impact B may present a position comprised between 30% and 50% of the chord of the airfoil 31, for example between 35% and 45% of the chord of the airfoil 31, along the longitudinal axis X. A distance between the point of impact B and the intrados wall 54 of the airfoil 31 along the circumferential axis may be strictly greater than, or substantially equal to, a distance between the trailing edge 52 of the airfoil 31 and the intrados wall 54 of the airfoil 31 along the circumferential axis. The point of impact B is thus located on an opposite side of the intrados wall 54 relative to the chord of the airfoil 31. The point of impact B can be located substantially on the extrados wall 530 of the circumferentially adjacent airfoil 310. The point of impact B can correspond substantially to a point of the extrados wall 530 of the circumferentially adjacent airfoil 310 which is closest to the airfoil 31 along a circumferential direction C perpendicular to the longitudinal direction L and to the radial direction R.

The suction aperture 35 opens out onto the path surface 321 of the platform 32, 33 on the intrados flow EI. In other words, at least part of the suction aperture 35 is located at the level of the intrados flow EI, for example at the level of a point of the flow line of the intrados flow EI. For example, at least part of the slot, of the oblong shape, of one or more circular orifices of the suction aperture 35, is located on the intrados flow EI.

When the blade assembly 25, 26 comprises an airfoil 31 and a circumferentially adjacent airfoil 31, the intrados flow EI globally flows between the point of separation A and the point of impact B located downstream of the leading edge 51 of the airfoil 31 and corresponding to a point at the level of which the intrados flow EI comes into contact with the extrados wall 530 of the circumferentially adjacent airfoil 310.

The suction aperture 35 and/or the ejection aperture 36 can extend along a main direction. The main direction corresponds to a direction in which one dimension of the suction aperture 35 and/or of the ejection aperture 36 is the largest. For example, in the case of a suction aperture 35 and/or of an oblong ejection aperture 36 having a length and a width, the main direction corresponds to the direction of the length of the oblong aperture. In the case of a suction aperture 35 and/or of an ejection aperture 36 comprising a plurality of orifices, the main direction corresponds to a direction of the largest dimension over which the orifices extend. In the case of a suction aperture 35 and/or of an ejection aperture 36 in the form of a slot, the main direction corresponds to a direction of larger dimension of the slot.

FIG. 5 illustrates different possibilities of arrangement of the suction aperture 35 and/or of the ejection aperture 36. In the following, when an element is described as "substantially parallel" or "substantially perpendicular", to the intrados flow EI or to a wall of the airfoil 31, it is understood that the element can have an inclination of a few degrees, for example an inclination less than 5°, relative to the parallel or to the perpendicular to the intrados flow EI or to the wall of the airfoil 31. When an element is located "at the level" of another element, it is understood that the element is located at a distance less than 5% from the chord of the airfoil 31 of the other element.

The suction aperture 35 can correspond to one of the following four suction apertures A1, A2, A3, A4:

- a first suction aperture 35, A1 which has an aperture that opens out onto the path surface 321 and that extends along a main direction substantially perpendicular to the direction of the intrados flow EI, the first suction aperture 35, A1 opening out towards the leading edge 51 or directly upstream of the leading edge 51 of the airfoil 31;
- a second suction aperture 35, A2 which has an aperture that opens out onto the path surface 321 and that extends along a main direction substantially perpendicular to the direction of the intrados flow EI, A2, the second suction aperture 35, A2 opening out downstream of the leading edge 51 of the airfoil 31, the second suction aperture 35, A2 opening out for example closer to the point of separation A than to the point of impact B;
- a third suction aperture 35, A3 which has an aperture that opens out towards the point of impact B or directly upstream of the point of impact B; or
- a fourth suction aperture 35, A4 which has an aperture that opens out onto the path surface 321 and that extends along a main direction substantially parallel to the direction of the intrados flow EI, the fourth suction aperture 35, A4 opening out between the leading edge 51 and the trailing edge 52 of the airfoil 31 along a circumferential direction C.

The first suction aperture 35, A1 makes it possible to capture the boundary layer of the intrados flow EI very early, at the beginning or even before the formation of the vortices of the intrados flow EI. The first aperture 35, A1 is located at the level of the leading edge 51. When the first suction aperture 35, A1 opens out directly upstream of the leading edge 51, a distance along the longitudinal axis X between the first suction aperture 35, A1 upstream of the leading edge 51 and the leading edge 51 is less than 10% of the chord of the airfoil 31. The first suction aperture 35, A1 can open out towards the point of separation A or directly downstream of the point of separation A, that is to say at a distance less than 10% of the chord of the airfoil 31 from the point of separation A, downstream of the latter. The first suction aperture 35, A1 opens out onto the path surface 321 in the upstream part of the platform 32, 33.

The second suction aperture 35, A2 makes it possible to capture the vortices of the intrados flow EI during formation. The second suction aperture 35, A2 is located downstream of the leading edge 51 of the airfoil 31 and downstream of the point of separation A. The second suction aperture 35, A2 can open out towards the leading edge 51, that is to say closer to the leading edge 51 than to the trailing edge 52, the second suction aperture 35, A2 opening out onto the path surface 321 in the upstream part of the platform 32, 33. A distance along the longitudinal axis X between the leading edge 51 of the airfoil 31 and the second suction aperture 35, A2 can be comprised between 1% and 20%, for example between 5% and 10% of the chord of the airfoil 31. The second suction aperture 35, A2 can open out substantially equidistant between the extrados wall 53 of the airfoil 31 and the extrados wall 530 of the circumferentially adjacent airfoil 310.

The third suction aperture 35, A3 makes it possible to capture the vortex of the intrados flow EI before its impact on the extrados wall 530 of the circumferentially adjacent airfoil 310. The third suction aperture 35, A3 is located at the level of the point of impact B or directly upstream of the point of impact B. In other words, the third suction aperture 35, A3 opens out closer to the leading edge 51 than to the trailing edge 52 of the airfoil 31 along the longitudinal axis X, or substantially equidistant from the leading edge 51 and from the trailing edge 52 of the airfoil 31 along the longitudinal axis X, for example opens out between 30% and 50% of the chord of the airfoil 31, for example between 35% and 45% of the chord of the airfoil 31. The third suction aperture 35, A3 is further from the intrados wall 54 of the airfoil 31 than the trailing edge 52 of the airfoil 31 along the circumferential axis, or has a position along the circumferential axis which corresponds substantially to a position of the trailing edge 52 of the airfoil 31. The third suction aperture 35, A3 can open out onto the point of the extrados wall 530 of the circumferentially adjacent airfoil 310 closest to the airfoil 31 along the circumferential direction C. When the third suction aperture 35, A3 opens out onto the point of impact B, the third suction aperture 35, A3 opens out at the level of the extrados wall 530 of the circumferentially adjacent airfoil 310. A distance between the third suction aperture 35, A3 and the extrados wall 530 of the circumferentially adjacent airfoil 310 along the longitudinal direction L and/or along the circumferential direction C can be less than 5% of the chord of the airfoil 31. The main direction of the third suction aperture 35, A3 can be substantially parallel to the direction of the intrados flow EI and/or can be substantially tangent to the extrados wall 530 of the circumferentially adjacent airfoil 310.

The fourth suction aperture 35, A4 makes it possible to capture the boundary layer which deflects from the intrados wall 54 of the airfoil 31 towards the extrados wall 530 of the circumferentially adjacent airfoil 310, and which continues to supply the vortices of the intrados flow EI. Indeed, the vortices of the intrados flow EI are also supplied by the flow along the intrados wall 54 of the airfoil 31, which is also sucked towards the extrados wall 530 of the circumferentially adjacent airfoil 310. The fourth suction aperture 35, A4 is located between the leading edge 51 and the trailing edge 52 of the airfoil 31 along the circumferential direction C, for example can open out closer to the trailing edge 52 than to the leading edge 51, the fourth suction aperture 35, A4 being away from the intrados wall 54 of the airfoil 31 by a certain distance along the circumferential axis. The fourth suction aperture 35, A4 can open out close to the leading edge 51 than to the trailing edge 52 of the airfoil 31 along the longitudinal direction L, the fourth suction aperture 35, A4 opening out into the upstream part of the platform 32, 33. The fourth suction aperture 35, A4 can open out between the point of separation A and the point of impact B, for example open out closer to the point of separation A than to the point of impact B. The fourth suction aperture 35, A4 opens out between the airfoil 31 and the circumferentially adjacent airfoil 310, for example can open out substantially equidistant from the airfoil 31 and from the circumferentially adjacent airfoil 310. The fourth aperture 35, A4 is slightly shifted downstream in the representation of FIG. 5, in order to preserve the readability of the figure.

The ejection aperture 36 can correspond to one of the following three ejection apertures EI, E2, E3:

- a first ejection aperture 36, EI located closer to the leading edge 51 than to the trailing edge 52 of the airfoil 31, which opens out towards the intrados wall 54 of the airfoil 31;
- a second ejection aperture 36, E2 located substantially between the leading edge 51 and the trailing edge 52 of the airfoil 31, which opens out towards the intrados wall 54 of the airfoil 31, the second ejection aperture 36, E2 preferably having a main direction substantially parallel to the intrados wall 54 of the airfoil 31; or a third ejection aperture 36, E3 located closer to the trailing edge 52 than to the leading edge 51 of the airfoil 31, and which preferably opens out towards the trailing edge 52 of the airfoil 31 airfoil circumferentially adjacent 310.

The first ejection aperture 36, EI makes it possible to re-energize the boundary layer at the level of the intrados wall 54 of the airfoil 31, in an area of the blade assembly 25, 26 which is located closer to the leading edge 51 than to the trailing edge 52 of the airfoil 31, therefore before the boundary layer begins to be deflected. The first ejection aperture 36, EI opens out onto the path surface 321 in the upstream part of the platform 32, 33. By opens out "towards" the intrados wall 54, it is understood that the first ejection aperture 36, EI is disposed so that a distance along the circumferential axis between the first ejection aperture 36, EI and the intrados wall 54 is less than 50% of a distance along the circumferential axis between the leading edge 51 and the trailing edge 52 of the airfoil 31. The first ejection aperture 36, EI can be located on the intrados wall 54 of the airfoil 31. The main direction of the first ejection aperture 36, EI can be substantially perpendicular to the intrados wall 54 of the airfoil 31.

The second ejection aperture 36, E2 makes it possible to re-energize the boundary layer at the level of the intrados wall 54 of the airfoil 31, along the airfoil 31, therefore before the boundary layer supplies the forming vortices. By opens out "towards" the intrados wall 54, it is understood that the second ejection aperture 36, E2 is located in the vicinity of the intrados wall 54 so that a distance along the circumferential axis between the second ejection aperture 36, E2 and the intrados wall 54 is less than 50% of a distance along the circumferential axis between the leading edge 51 and the trailing edge 52 of the airfoil 31. The second ejection aperture 36, E2 can open out onto the path surface 321 in the upstream part and/or in the downstream part of the platform 32, 33. A main direction of the second ejection aperture 36, E2 substantially parallel to the intrados wall 54 makes it possible to best energize the stream at the level of the second ejection aperture 36, E2.

The third ejection aperture 36, E3 makes it possible to energize the boundary layer in an area of the blade assembly 25, 26 which is located in the vicinity of the trailing edge 52 of the airfoil 31, that is to say closer to the trailing edge 52 than to the leading edge 51 of the airfoil 31. The third ejection aperture 36, E3 opens out onto the path surface 321 in the downstream part of the platform 32, 33. The third ejection aperture 36, E3 can be located directly upstream or directly downstream of the trailing edge 52 of the airfoil 31 along the longitudinal axis X. The third ejection aperture 36, E3 can have a distance along the circumferential axis relative to the trailing edge 52 of the airfoil 31 corresponding substantially to a distance along the circumferential axis from the leading edge 51 to the trailing edge 52 of the airfoil 31. The third ejection aperture 36, E3 can open out substantially equidistant between the intrados wall 54 of the airfoil 31 and the extrados wall 53 of the circumferentially adjacent airfoil 310, or can open out closer to the extrados wall 530 of the circumferentially adjacent airfoil 310 than to the intrados wall 54 of the airfoil 31. The third ejection aperture 36, E3 can be substantially parallel to the stream flowing in the primary flow path 21A, in order to best energize the stream at the level of the third ejection aperture 36, E3.

The combination of the suction aperture 35 and of the ejection aperture 36 is chosen so as to ensure a sufficient pressure gradient between the suction area and the ejection area, the total pressure in the suction area being at least greater than the static pressure in the ejection area, and so as to minimize the length of the inner channel 34, with a view to minimizing pressure losses. All combinations of the first, the second, the third or the fourth suction aperture 35, A1, A2, A3, A4 with the first, the second or the third ejection aperture 36, EI, E2, E3 are possible.

In one particular embodiment, the suction aperture 35 corresponds to the first suction aperture A1 and the ejection aperture 36 corresponds to the third ejection aperture E3. This particular embodiment makes it possible to establish a considerable pressure difference between the first suction aperture 35, A1 and the third ejection aperture 36, E3, which makes it possible to increase the air flow rate circulating within the inner channel 34. The ejection aperture 36, E3 is located in a low-pressure area, which makes it possible to optimize the efficiency of the reduction of the vortices by the blade assembly 25, 26, despite the pressure losses due to the considerable length of the inner channel 34.

In other embodiments, the suction aperture 35 corresponds to the first suction aperture A1 and the ejection aperture 36 corresponds to the first ejection aperture EI, or the suction aperture 35 corresponds to the second suction aperture A2 and the ejection aperture 36 corresponds to the third ejection aperture E3, or the suction aperture 35 corresponds to the third suction aperture A3 and the ejection aperture 36 corresponds to the third ejection aperture E3, or the suction aperture 35 corresponds to the fourth suction aperture A4 and the ejection aperture 36 corresponds to the second ejection aperture E2.

The inner channel 34 is formed in the platform 32, 33, between the path surface 321 and the second surface 322 of the platform 32, 33. The inner channel 34 can be a tubular shaped channel. The inner channel 34 has a shape and dimensions adapted according to the sucked and ejected air flow rate, that is to say according to the air flow rate circulating in the inner channel 34, so as to give the air flow rate taken by the suction aperture 35 optimized speed and angle at the level of the ejection aperture 36. In this regard, the shapes and dimensions of the inner channel 34 are determined according to the specific case, in particular with regard to the predefined location of the blade assembly 25, 26 within the primary flow path 21A.

The inner channel 34 can comprise one or more undulations, in other words one or more curvatures, in particular if it comes to adapting the shape of the inner channel 34 to a particular bulk within the airfoil 31 and/or the platform 32, 33. The inner channel 34 has an aerodynamic shape making it possible to reduce the aerodynamic losses during the flow of the fluid sucked into the inner channel 34.

A section of the inner channel 34 of the ejection aperture 36 may be smaller than a section of the inner channel 34 of the suction aperture 35. A surface of the ejection aperture 36 may be smaller than a surface of the suction aperture 35. The inner channel 34 thus has a flared shape tapering down towards the ejection aperture 36. Thus, the speed of the flow at the level of the ejection aperture 36 at the outlet of the inner channel 34 is increased, which makes it possible to optimally re-energize the boundary layer at the level of the ejection aperture 36.

The blade assembly 25, 26 can comprise several inner channels 34 formed in the same platform 32, 33, each inner channel 34 comprising a suction aperture 35 and an ejection aperture 36 as described above. The several inner channels

34 can be independent or connected together. A blade assembly 25, 26 comprising several inner channels 34 makes it possible to suck the boundary layer at the level of several suction areas, and to re-energize the boundary layer at the level of several ejection areas.

The inner channel 34 can be dug into the platform 32, 33. The inner channel 34 can be manufactured by foundry, or by additive manufacturing, without limitation by laser metal fusion on a powder bed, in particular when the inner channel 34 and/or or the platform 32, 33 has a complex geometry. Preferably, the airfoil 31 and the platforms 32, 33 are manufactured in one piece.

The blade assembly 25, 26 of the gas turbine engine 10 as described above can be a distributor 25. The platform 32, 33 of the distributor 25 can be an inner platform 32 and/or an outer platform 33 as described above. Particularly, the distributor 25 can comprise an inner platform 32 and an outer platform 33 as described above, a first inner channel 34 as described above formed in the inner platform 32 and a second inner channel 34 as described above formed in the outer platform 33. The distributor 25 is preferably a distributor 25 of a low-pressure turbine 18 or of a high-pressure turbine 17. As a variant, the distributor 25 can be a distributor 25 of a low-pressure compressor 14 or of a high-pressure compressor 15.

The gas turbine engine 10 blade assembly 25, 26 as described above can be a rotor wheel 26. The platform 32, 33 of the rotor wheel 26 is an inner platform 32 as described above, the inner channel 34 being formed in the inner platform 32. The rotor wheel 26 is preferably a rotor wheel 26 of a low-pressure turbine 18 or of a high-pressure turbine 17. As a variant, the rotor wheel 26 can be a rotor wheel 26 of a low-pressure compressor 14 or of a high-pressure compressor 15.

A gas turbine engine 10 turbine 17, 18 can comprise at least a blade assembly 25, 26 as described above, for example can comprise one or more distributors 25 and/or one or more rotor wheels 26 as described above. As a variant, a gas turbine engine 10 compressor 14, 15 can comprise at least a blade assembly 25, 26 as described above. Each distributor 25 and/or rotor wheel 26 comprises a plurality of blades 30 circumferentially distributed about the axis X. Each distributor 25 and/or rotor wheel 26 can comprise an alternation of conventional airfoils 31 and platforms 32, 33 and of airfoils 31 and platforms 32, 33 as described above.

The rotor wheels 26 are assembled axially to each other by annular flanges 27 and form the rotor of the turbine 18. The blades 30 of the rotor wheel 26 can be connected to the turbine disk 24 by a base secured to the inner platform 32. The distributors 25 are connected to a turbine casing 28 to form the stator of the turbine 18, for example by at least an attachment element secured to the outer platform 33.

Figure 3:
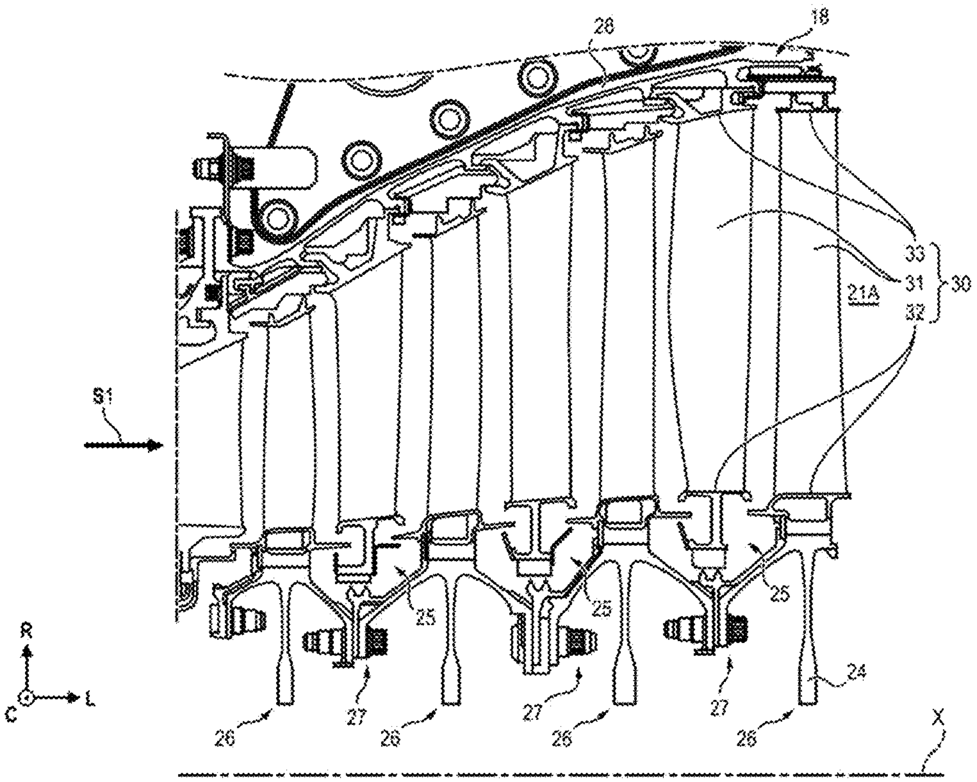
FIG. 3 is a partial schematic axial sectional view of a low-pressure turbine of a gas turbine engine.

The turbine can be a low-pressure turbine 18. Thus, FIG. 3 illustrates by way of non-limiting example a low-pressure turbine 18 comprising four stages, each stage comprising a distributor 25 and a rotor wheel 26. As a variant, the turbine can be a high-pressure turbine 17. The longitudinal axis X corresponds to the axis of rotation of the rotor of the turbine 17, 18.

A gas turbine engine 10 can comprise a turbine 17, 18 comprising at least a blade assembly 25, 26 as described above. The gas turbine engine 10 can be a two-spool gas turbine engine.

An aircraft can comprise at least a blade assembly 25, 26 as described above, particularly can comprise at least a gas turbine engine 10 as described above.

Other embodiments can be envisaged and those skilled in the art can easily modify the embodiments or exemplary embodiments set out above or consider others while remaining within the framework of the invention.

The invention claimed is:

1. A gas turbine engine blade assembly intended to be mounted about a longitudinal axis, and comprising:

an airfoil extending radially with respect to the longitudinal axis and has an aerodynamic profile delimited axially upstream by a leading edge and downstream by a trailing edge, the airfoil further comprising an intrados wall and an extrados wall opposite to the intrados wall, the intrados wall and the extrados wall each connecting the leading edge to the trailing edge;

a platform comprising a path surface, the airfoil extending from the path surface, the platform being intended to delimit a primary flow path of a stream of the gas turbine engine in operation, the stream dividing, upstream of the leading edge of the airfoil during the operation of the gas turbine engine, into an extrados flow flowing on a side of the extrados wall of the airfoil and into an intrados flow flowing on a side of the intrados wall of the airfoil; and an inner channel having a suction aperture and an ejection aperture, the suction aperture and the ejection aperture are each disposed on the side of the intrados wall of the airfoil and opened out onto the path surface of the platform, the ejection aperture opening out downstream of the suction aperture and the suction aperture opening out towards the intrados flow.

2. The gas turbine engine blade assembly according to claim 1, wherein the suction aperture and/or the ejection aperture have at least one of:

a circular shape, an oblong shape, a shape slot, a flared shape, a plurality of orifices.

3. The gas turbine engine blade assembly according to claim 1, wherein the intrados flow flows globally between a point of separation located upstream of the leading edge of the airfoil and where the intrados flow and the extrados flow divide, and a point of impact located downstream of the leading edge of the airfoil and where the intrados flow comes into contact with an airfoil circumferentially adjacent to the airfoil, wherein the suction aperture extends along a main direction and corresponds to one of the following four suction apertures:

a first suction aperture having an aperture opening out onto the path surface and extending along a main direction substantially perpendicular to a direction of the intrados flow, the first suction aperture opening out towards the leading edge or directly upstream of the leading edge of the airfoil;

a second suction has aperture having an aperture opening out onto the path surface and extending along a main direction substantially perpendicular to the direction of the intrados flow, the second suction aperture opening out downstream of the leading edge of the airfoil, the second suction aperture opening out closer to the point of separation than to the point of impact;

a third suction has aperture having an aperture opening out towards the point of impact; or a fourth suction aperture having an aperture opening out onto the path surface and extending along a main direction substantially parallel to the direction of the intrados flow, the fourth suction aperture opening out between the leading edge and the trailing edge of the airfoil along a circumferential direction.

4. The gas turbine engine blade assembly according to claim 1, wherein the ejection aperture extends along a main direction and corresponds to one of the following three ejection aperture:

a first ejection aperture located closer to the leading edge than to the trailing edge of the airfoil, the first ejection aperture opening out towards the intrados wall of the airfoil;

a second ejection aperture located substantially between the leading edge and the trailing edge of the airfoil, the second ejection aperture opening out towards the intrados wall of the airfoil, the second ejection aperture preferably having a main direction substantially parallel to the intrados wall of the airfoil; or a third ejection aperture located closer to the trailing edge than to the leading edge of the airfoil and the third ejection aperture opening out towards the trailing edge of the airfoil.

5. The gas turbine engine blade assembly according to claim 1, wherein a section of the inner channel of the ejection aperture is smaller than a section of the inner channel of the suction aperture.

6. The gas turbine engine blade assembly according to claim 1 wherein the platform is an inner platform, the path surface of the inner platform being adapted to delimit the primary flow path radially inwards.

7. The gas turbine engine blade assembly according to claim 1, extending radially about the longitudinal axis and further comprising another airfoil circumferentially adjacent to the airfoil, wherein the circumferentially adjacent airfoil extends radially with respect to the longitudinal axis and has an aerodynamic profile delimited axially upstream by a leading edge and downstream by a trailing edge, the circumferentially adjacent airfoil further comprises an intrados wall and an extrados wall opposite to the intrados wall, the intrados wall and the extrados wall each connecting the leading edge to the trailing edge, wherein the circumferentially adjacent airfoil is adapted to extend radially from the path surface of the platform in the primary flow path so that the extrados wall of the circumferentially adjacent airfoil is located facing the intrados wall of the airfoil, wherein the intrados flow globally flows between a point of separation located upstream of the leading edge of the airfoil and where the intrados flow and the extrados flow divide, and a point of impact located downstream of the leading edge of the airfoil and where the intrados flow comes into contact with the extrados wall of the circumferentially adjacent airfoil.

8. The gas turbine engine blade assembly according to claim 1, wherein the blade assembly is a gas turbine engine turbine distributor.

9. A gas turbine engine comprising at least a turbine comprising at least a blade assembly according to claim 1.

10. The gas turbine engine blade assembly according to claim 4, wherein the ejection aperture extends along a main direction and being located closer to the trailing edge than to the leading edge of the airfoil and the third ejection aperture opening out towards the trailing edge of the airfoil.

* * * * *